O. GROSVENOR.
APPARATUS FOR SHAPING FABRICS.
APPLICATION FILED AUG. 17, 1916.

1,254,685.

Patented Jan. 29, 1918.

WITNESS:
S. F. Taylor.

INVENTOR
Oliver Grosvenor,
BY
Ernest Hopkinson
HIS ATTORNEY

UNITED STATES PATENT OFFICE.

OLIVER GROSVENOR, OF NEW YORK, N. Y., ASSIGNOR TO MORGAN & WRIGHT, A CORPORATION OF MICHIGAN.

APPARATUS FOR SHAPING FABRICS.

1,254,685.  Specification of Letters Patent.  Patented Jan. 29, 1918.

Application filed August 17, 1916. Serial No. 115,364.

*To all whom it may concern:*

Be it known that I, OLIVER GROSVENOR, a citizen of the United States, and a resident of New York city, in the county and State of New York, have invented certain new and useful Improvements in Apparatus for Shaping Fabrics, of which the following is a full, clear, and exact description.

My invention relates particularly to a device or apparatus for shaping fabrics adapted to form the carcass or body portion of tire casings or shoes. Heretofore it has been the general practice to apply the rubber coated fabric to the core or ring on which the tire is built in successive layers, the fabric being made to conform to the required shape by being smoothed or rolled into position so that the outer or tread portion of the fabric is elongated to conform to the larger diameter of the core, while the margins or bead portions are contracted to conform to the edges or beads of the tire casing. This distortion of the fabric elongates the openings or interstices between the threads of the fabric, making them diamond-shaped longitudinally of the tread and diamond-shaped transversely of the tire along the margins. It is the object of my invention to produce this distortion or forming of the fabric more uniformly and prior to being placed on the ring or core, so that there is less irregularity of strain or tension on the threads and the fabric will be more evenly distributed and less liable to wrinkling or puckering.

Briefly stated my invention comprises a drum or wheel which is circumferentially divided into a plurality of sections, the sections being driven positively at certain differential, fixed, relative speeds to correspond with the particular amount of stretch or distortion required in the tire fabric to be built up into a tire of a particular size.

For a detailed description of one form of my invention, reference may be had to the following specification and to the accompanying drawings forming a part thereof, in which.

Figure 1:
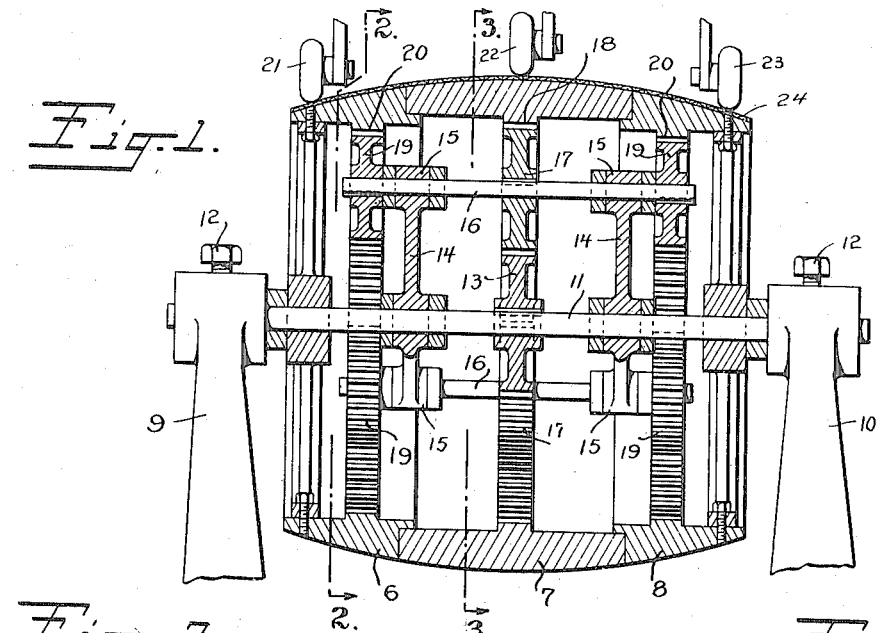
Figure 1 is a vertical longitudinal section of my improved device for shaping tire fabric.
Figure 2:
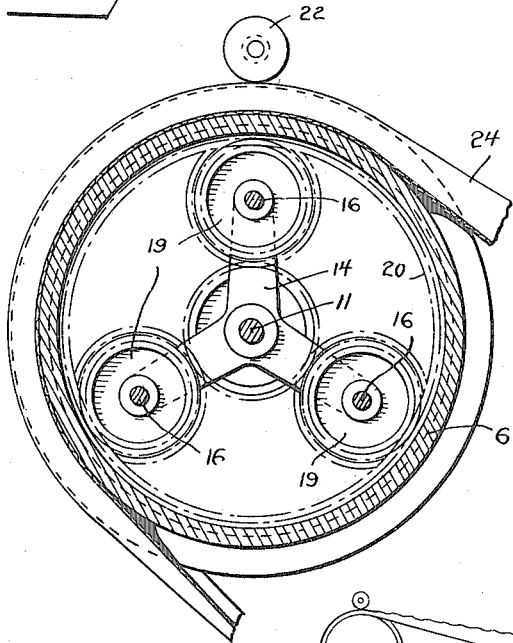
Fig. 2 is a transverse sectional view thereof, taken substantially on the line 2—2, Fig. 1.
Figure 3:
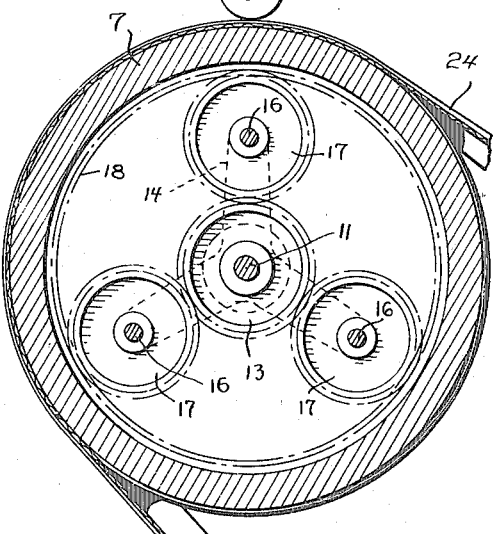
Fig. 3 is a transverse sectional view taken substantially on the line 3—3, Fig. 1.
Figure 4:
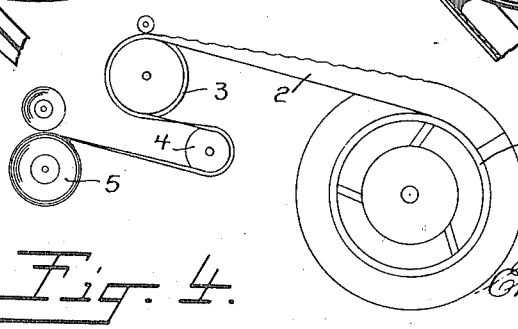
Fig. 4 is a diagrammatic view showing the relation of the fabric forming drum to the tire being built.

Referring first to Fig. 4 of the drawings, the numeral 1 indicates a power-driven ring or core upon which the tire carcass is built; 2 indicates the fabric being applied thereto; 3 indicates my improved fabric forming device; 4 is an idle roll whose rotation may be retarded by a friction brake or other suitable means and over which the fabric 2 passes from the stock roll 5. In the present form of the invention, the forming drum 3 consists of three separate sections 6, 7, and 8 which may be crowned as indicated in Fig. 1 of the drawings, or may be cylindrical if preferred. The drum formed of these sections is supported in any suitable manner, such as by standards 9 and 10, through which passes a shaft 11 which may be prevented from revolving by means of the set screws 12. At the central portion of the shaft 11 is a fixed gear 13 which is keyed to said shaft. Also supported on said shaft 11, but free to turn thereon, are two sets of arms or spiders 14 which have bearings 15 at their outer ends through which pass shafts 16. Fixed to each of the shafts 16 are three gears, the central one 17 of which engages the stationary gear 13 and also internal gear teeth 18 on the central section 7 of the drum. The two sets of gears 19 are fixed to the outer ends of said shafts 16 and mesh with internal gear teeth 20 on the sections 6 and 8 of the drum. The numerals 21, 22 and 23 indicate pressure wheels or rollers which are adapted to bear on the respective sections of the drum so that the fabric passing over the drum as indicated by 24, will be pressed into contact therewith to increase the frictional engagement at corresponding points. However, where the frictional engagement between the fabric and the surface of the drum is sufficient these pressure rolls may be omitted.

From the foregoing description it will now be seen that the fabric, in being drawn over the drum by the rotation of the core or ring 1, will contact with the central section 7, thereby causing it to rotate about the fixed shaft 11. This rotation will rotate the gears 17 so that the shaft 16 will revolve as a whole about the shaft 11 at exactly one-half the speed of the said section of the drum 18. The gears 20 will be carried around at the same speed but will rotate on shaft 16 at a speed depending upon their diameters as compared with the diameters of the gear 17. As will be readily appreciated by considering the instantaneous or differential speeds on the diameters of these gears, the teeth 19 when in contact with the gear 20 will travel at a lineal speed relative to the speed of the teeth of the gear 17, where in contact with the gear 18, in the same proportion that the sum of the radii of the gears 19 and 17 is to the diameter of the gear 17.

For example, assuming the diameter of the gear formed by the teeth 18 to be 15 inches, the diameter of the gear 17 to be 5 inches, the diameter of the gear 13 to be 5 inches, and it is desired to cause the drum section 7 to travel at a 15% higher speed than that of the sections 6 and 8, the diameter of the gear 19 would have to be 3.68 and the gear 20 would be 13.68 inches. In other words, if the gear 18 had 225 teeth, the gear 17 would have 75 teeth, the gear 19 would have 55 teeth, and the gear 20 would have 205 teeth. Under these dimensions the central section would have a speed 15% greater than the outside sections 6 and 8. Now assuming that the surface of the drum as a whole is crowned to such an extent that the central portion would travel at a 15% greater lineal speed than the outside edges if the whole drum were made integral, then this 15% added to the 15% resulting from the differential action of the planetary gears would cause the center of the fabric on the drum to travel at a 30% higher speed than the edges of the fabric. In the building up of a 34x4 inch tire carcass, the outside diameter is approximately 34 inches and the diameter of the beads or edges is 26 inches. The tread portion therefore would revolve at a lineal speed about 30% greater than that of the bead or edge portion. Hence the fabric in passing over the differential drum would be stretched to substantially the same percentage as it is required to be stretched when laid upon the ring or core during the building of the carcass. In this manner the tire fabric is formed into substantially the necessary shape before being placed in position and is therefore less liable to be distorted while being smoothed or rolled finally into position. If the drum is made cylindrical, the gears may be designed to cause the sections of the drum to produce the entire stretch.

It is obvious that instead of making the drum in three sections a greater number of sections may be used, each of the sections turning at relatively greater speeds from the outer sections toward the center section.

Having thus described one form of my invention, what I claim and desire to protect by Letters Patent is:

1. A device for forming fabric comprising a drum divided circumferentially into a plurality of sections, and positive transmission means for positively connecting said sections causing independent rotation of the same, at fixed differential speeds.

2. A device for forming fabrics comprising a drum divided circumferentially into a plurality of sections, and positive transmission means positively connecting the respective sections whereby the outer sections are positively driven at a fixed rate of speed different from that of the central section.

3. A device for forming fabrics comprising a drum divided circumferentially into a plurality of sections, means for driving said sections at different relative, fixed speeds comprising a central fixed gear, an internal gear on the central section, planetary gears meshing with said gears, shafts to which said planetary gears are fixed and connections between said shafts and the outer sections for driving the latter.

4. A device for forming fabrics comprising a drum divided circumferentially into a plurality of sections, and means for driving said sections at different relative speeds, comprising a central fixed gear, an internal gear on the central section, planetary gears meshing with said gears, shafts to which said planetary gears are attached, outer gears fixed on said shafts and internal gears on said outer sections meshing with the last named gears.

5. A device for forming fabrics comprising a drum divided circumferentially into a plurality of sections and tooth-gearing for positively connecting said sections causing interdependent rotation of the same at variable speeds.

Signed at Cleveland, county of Cuyahoga and State of Ohio this 10th day of Aug., 1916.

OLIVER GROSVENOR.